(12) United States Patent
Honda

(10) Patent No.: US 7,336,382 B2
(45) Date of Patent: Feb. 26, 2008

(54) IMAGE FORMING APPARATUS PRINTING WITH A DECREASE IN THE QUANTITY OF PRINTING MATERIAL

(75) Inventor: Masashi Honda, Shizuoka-ken (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 947 days.

(21) Appl. No.: 10/418,169

(22) Filed: Apr. 18, 2003

(65) Prior Publication Data
US 2003/0197891 A1    Oct. 23, 2003

(30) Foreign Application Priority Data
Apr. 22, 2002 (JP) ............... 2002-119431

(51) Int. Cl.
*G06F 15/00* (2006.01)
*G06K 1/00* (2006.01)
(52) U.S. Cl. ........................................... 358/1.15
(58) Field of Classification Search ............ 358/1.1, 358/1.9, 1.11–1.18, 462; 347/5, 19
See application file for complete search history.

(56) References Cited

U.S. PATENT DOCUMENTS 6,257,693 B1 * 7/2001 Miller et al. ................. 347/19
6,975,421 B1 * 12/2005 Hashimoto et al. ......... 358/1.16

FOREIGN PATENT DOCUMENTS

JP        8-97945 A        4/1996

* cited by examiner

*Primary Examiner*—Gabriel Garcia
*Assistant Examiner*—Thierry Pham
(74) *Attorney, Agent, or Firm*—Foley & Lardner LLP

(57) ABSTRACT

An image forming apparatus includes a connection unit which is connected to a network to perform communication, a receiving unit which receives printing information including at least page kind data indicating the kinds of data for each page and image data, through the connection unit, an image processing unit which performs image processing for the image data to properly decrease the quantity of printing material used for printing for each predetermined unit, based on the received page kind data, and a printer which prints on a medium based on the image data for which the image processing has been performed.

12 Claims, 3 Drawing Sheets

| Printing information ||| |
|---|---|---|
| Page kind data | Page data | Image data |
| Text data 50%<br>Graphic data 30%<br>Image data 20% | 1/n | 1st page image data |
| Text data 100%<br>Graphic data 0%<br>Image data 0% | 2/n | 2nd page image data |
| Text data 60%<br>Graphic data 20%<br>Image data 20% | 3/n | 3rd page image data |
| Text data 60% | 4/n | 4th page image data |

| Printing information | | |
|---|---|---|
| Page kind data | Page data | Image data |
| Text data 50%<br>Graphic data 30%<br>Image data 20% | 1/n | 1st page image data |
| Text data 100%<br>Graphic data 0%<br>Image data 0% | 2/n | 2nd page image data |
| Text data 60%<br>Graphic data 20%<br>Image data 20% | 3/n | 3rd page image data |
| Text data 60% | 4/n | 4th page image data |

IMAGE FORMING APPARATUS PRINTING WITH A DECREASE IN THE QUANTITY OF PRINTING MATERIAL

CROSS-REFERENCE TO RELATED APPLICATIONS

This application is based upon and claims the benefit of priority from the prior Japanese Patent Application No. 2002-119431, filed Apr. 22, 2002, the entire contents of which are incorporated herein by reference.

BACKGROUND OF THE INVENTION

1. Field of the Invention

The present invention relates to an image forming apparatus which receives printing information through a communication line, and performs printing based on the printing information.

2. Description of the Related Art

Generally, an image forming apparatus, such as a printer, a copier and a digital composite machine, using toner or ink as a printing material is know. Such an image forming apparatus requires a printing cost corresponding to the quantity of toner used for printing each image data included in the printing information, when toner is used for printing, for example. Therefore, the user demands for decreasing the cost by decreasing the quantity of toner. To realize this demand, it is considered to decrease the quantity of toner by performing image processing to decrease the image data printing area, and then printing based on this processed printing information.

However, the printing information, received by an image forming apparatus connected to a computer system via a network, includes different kinds of image data such as text data, graphic data and image data. Thus, it is possible to maintain the printing quality of the text data, while decreasing the quantity of toner by processing the image data to decrease the quantity of toner to meet the text data. But, for the image data, even if the toner quantity can be decreased, the printing quality may not be maintained because of the stripes (moirés) occurred on the printed image. There is a toner save mode to evenly decrease the quantity of toner, but the purpose of this mode is only to decrease the toner quantity, and the printing quality is not good.

Therefore, there is a need for an image forming apparatus which can decrease the quantity of printing material used for printing to meet the kinds of image data included in the received printing information, and maintain the printing quality, as well.

BRIEF SUMMARY OF THE INVENTION

According to an aspect of the present invention, there is provided an image forming apparatus comprising a connection unit which is connected to a network to perform communication; a receiving unit which receives printing information including at least page kind data indicating the kinds of data for each page and image data, through the connection unit; an image processing unit which performs image processing for the image data to properly decrease the quantity of printing material used for printing for each predetermined unit, based on the received page kind data; and a printer which prints on a medium based on the image data for which the image processing has been performed.

Objects and advantages of the invention will become apparent from the description which follows, or may be learned by practice of the invention.

BRIEF DESCRIPTION OF THE SEVERAL VIEWS OF THE DRAWING

The accompanying drawings illustrate embodiments of the invention, and together with the general description given above and the detailed description given below, serve to explain the principles of the invention.

DETAILED DESCRIPTION OF THE INVENTION

An image forming apparatus of the present invention applied to a digital composite machine 1 will be explained with reference to the accompanied drawings.

First Embodiment

Figures 1, 2:
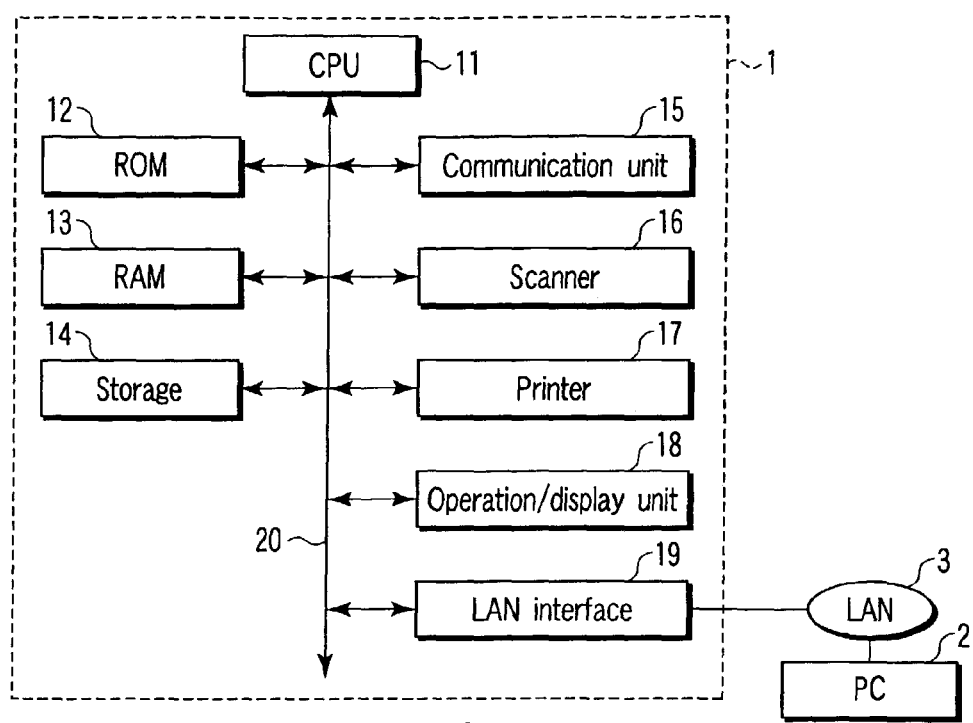
FIG. 1 is a block diagram showing the configuration of a digital composite machine according to a first embodiment of the present invention.
FIG. 2 is a table showing an example of printing information.

FIG. 1 is a block diagram showing the configuration of a digital composite machine 1, and a personal computer (PC) 2 connected to the digital composite machine 1. As shown in FIG. 1, the digital composite machine 1 is communicably connected through a local area network (LAN) 3.

The digital composite machine 1 comprises a CPU 11, a ROM 12, a RAM 13, a storage 14, a communication unit 15, a scanner 16, a printer 17, an operation/display unit 18, and a LAN interface 19. The CPU 11 is connected through a bus line 20 to the ROM 12, RAM 13, storage 14, communication unit 15, scanner 16, printer 17, operation/display unit 18 and LAN interface 19.

The CPU 11 realizes the operation as a digital composite machine 1 by executing the control operation to generally control each unit, based on the control program stored in the ROM 12. The ROM 12 stores the control program executed by the CPU 11. The RAM 13 has a work area to store temporarily the information necessary for the CPU 11 to perform various processes.

The storage 14 is a large capacity DRAM or a hard disk unit, for example. The storage 14 stores temporarily the printing information received from the PC 2 through the LAN 3. The storage 14 also stores the control program to perform the image processing to properly decrease the quantity of toner as a printing material used for printing the printing information. The control program to perform this image processing includes a plurality of image processing modes as explained later. It is also permitted to perform the image processing with an image processing circuit that is a kind of hardware.

The communication unit 15 includes a telephone controller, a modem, a line signal detector, an encoder/decoder and a clock (not shown), and realizes a facsimile function. The scanner 16 reads the image of document placed at a predetermined position. The communication unit 15 and scanner 16 are the same as the conventional ones, and the detailed explanation will be omitted.

The printer 17 prints on a medium based on the printing information for which the image processing has been performed based on the control program stored in the storage 14. The printer 17 prints the printing information on a medium in the process of electrophotography executed by an exposing unit, a developing unit, a transfer unit and a fixing unit, which are not shown. That is, the exposing unit forms an electrostatic latent image of the image data on a photoconductive body. The developing unit supplies toner to the electrostatic latent image formed on the photoconductive body, and changes the electrostatic latent image to a developer image. The transfer unit transfers the developer image to the medium. The fixing unit fixes the image on the medium.

The operation/display unit 18 has a key input section to accept the user's various instruction inputs to the CPU 11. The unit also has a display section to display various information to be notified to the user under the control of CPU 11.

The LAN interface 19 is used for connection with the LAN 3. The LAN interface 19 receives the printing information from the PC 2 through the LAN 3.

FIG. 2 shows an example of the printing information received by the digital composite machine 1. In the header of the printing information, a page kind data and page data are added to the image data for each page. The printing information including the page kind data and image data is formed by a driver built in the PC 2. The page kind data in this embodiment consists of text data indicating characters, graphic data indicating graphics, and image data indicating photographs. The page kind data also indicates the ratio of the areas to print these data. The printing areas can be printing areas to actually fix toner for these data, or can be an area to print each data. The page kind data is to include the ratio of the areas to print each data, but it is also permitted not to include this data and to include the data indicating whether each data is included in each page.

In the digital composite machine 1 configured as described above, the ROM 12 storing the control program executed by the CPU 11 also includes the general control programs used in the digital composite machine 1.

A plurality of image processing modes for the image processing is available in two modes for two cases where the page kind data includes image data, and where it does not include the image data. One of the modes is selected for each page, based on the page kind data of the printing information received from the PC 2, and added for each page.

One mode is for the image processing with priority given to the reproduction of image, over the decrease of toner quantity. Namely, when the page kind data includes image data, the quantity of toner is decreased to the extent to maintain the printing quality of image when the image data is printed. For example, in this image processing mode, the quantity of toner is decreased a little compared with ordinary printing.

The other mode is for the image processing to reproduce text and graphics by decreasing the quantity of toner as far as possible. Namely, when the page kind data does not include image data, the quantity of toner is decreased to the extent to maintain the printing quality of text when the image data is printed. For example, in this image processing mode, the quantity of toner is decreased by decreasing the printing area by executing a process to make the characters thin.

Figure 3:
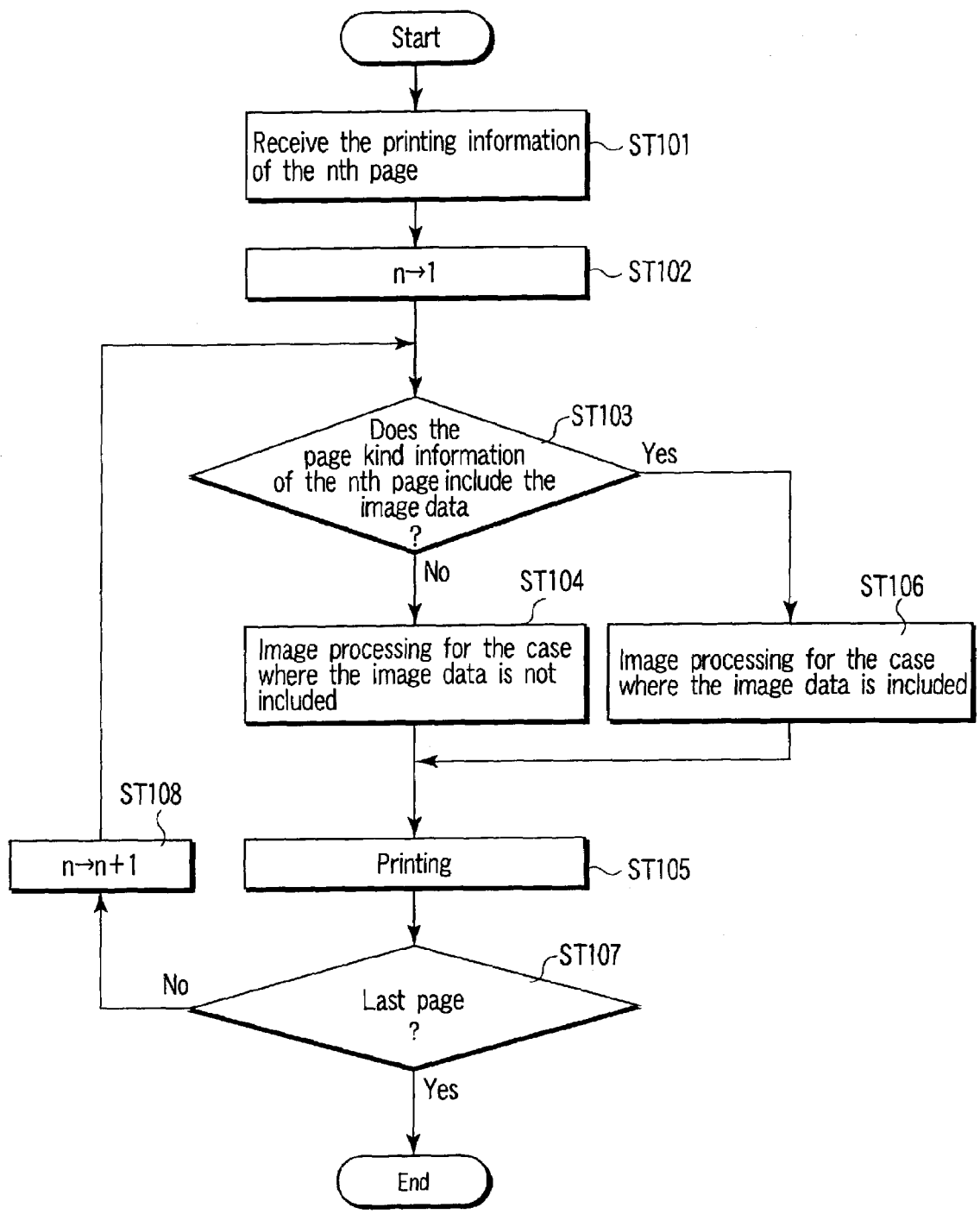
FIG. 3 is a flow chart showing the processes executed by a CPU.

FIG. 3 is a flow chart showing the processes executed by the CPU 11 when the digital composite machine 1 receives the printing information of the nth page including the page kind data from the PC2 through the LAN 3.

The CPU 11 stores the received printing information including the page kind data in the storage 14 (ST101), sets a variable "n" indicating the number of pages to "1" (ST102), and determines whether the page kind data of the $1^{st}$ page includes the image data (ST103).

When the CPU 11 determines in step ST103 that the page kind data does not include the image data, the CPU 11 performs the image processing for the case not including the image data for the image data of the $1^{st}$ page (ST104). Based on the image data of the $1^{st}$ page for which the image processing is performed, the CPU 11 controls the printer 17 to print on a medium (ST105).

When the CPU 11 determines in step ST103 that the page kind data includes the image data, the CPU 11 performs the image processing for the case including the image data for the image data of the $1^{st}$ page (ST106). Based on the image data of the $1^{st}$ page for which the image processing is performed, the CPU 11 controls the printer 17 to print on a medium (ST105).

After printing the $1^{st}$ page, the CPU 11 determines whether the printed page is the last page. Namely, the CPU 11 determines whether the printed page is the nth page or not (ST107). When the page is not the nth page, the CPU 11 adds "1" to the variable "n" to change it "2" (ST108), returns to step ST103, and determines whether the image data of the $2^{nd}$ page includes the image data.

The CPU 11 determines whether the image data is included for each page, and performs the corresponding image processing and printing, until the page printed in step ST107 is judged to be the nth page. When the printed page is the last page or the nth page, the CPU 11 finishes the process.

In the first embodiment, the digital composite machine 1 receives the printing information with the page kind data, indicating the ratio of image data, text data and graphic data, added for each page. The digital composite machine 1 determines whether the image data is included in the page kind data for each page. The digital composite machine 1 performs image processing for the image data to decrease the toner quantity, in each mode for the case where the image data in included, or the case where the image data is not included, and then executes printing. Therefore the digital composite machine 1 can print to maintain the printing quality for each page, while decreasing the quantity of toner used for printing.

Further, since the mode of the control program to perform image processing to decrease the toner quantity can be previously set for each page based on the kind of the page kind data, the digital composite machine 1 can reproduce data by printing as desired by the user.

Second Embodiment

Next, a second embodiment of the present invention will be explained. The same reference numerals are give to the same components as in the first embodiment, and the detailed explanation will be omitted.

Figure 4:
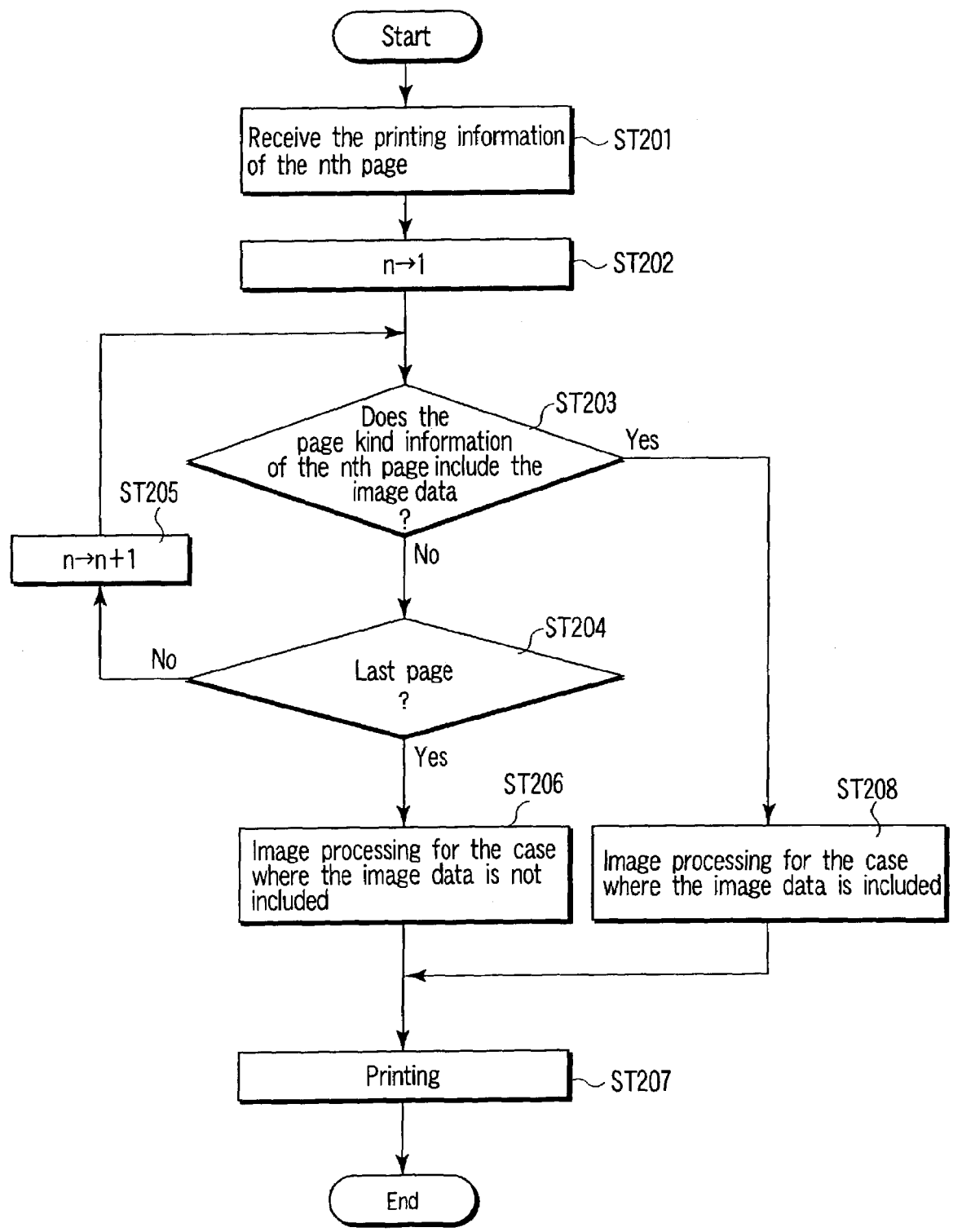
FIG. 4 is a flow chart showing the processes executed by a CPU in a second embodiment of the present invention.

FIG. 4 is a flow chart showing the processes executed by the CPU 11 of the digital composite machine 1 when the printing information of the nth page including the page kind data and image data in the second embodiment.

The CPU 11 stores the received printing information including the page kind data and image data in the storage 14 (ST201), sets a variable "n" indicating the number of pages to "1" (ST202), and determines whether the page kind data of the $1^{st}$ page includes the image data (ST203).

When the CPU 11 determines in step ST203 that the page kind data does not include the image data, the CPU 11 determines whether the page is the last page or not (ST204). When the page is not the last page, the CPU 11 adds "1" to the variable "n" to change it to "2" (ST205), return to step ST203, and determines whether the page kind data of the $2^{nd}$ page includes the image data.

The CPU performs the operations of steps ST203 to ST205 for all pages to the last page. When the page is the last page or the variable "n" is "n" is step ST204, the CPU 11 performs image processing for all pages of the printing information in the mode for the case where the image data is not included in the page kind data (ST206). Based on the image data for which the corresponding processing has been performed, the CPU 11 controls the printer 17 to print all pages (ST207).

When the CPU 11 determines in step ST203 that the page kind data includes the image data, the CPU 11 performs the image processing for all pages in the mode for the case where the image data is included (ST208). Based on the image data for which the image processing has been performed, the CPU 11 controls the printer 17 to print all pages (ST207).

In the second embodiment, the digital composite machine 1 determines whether the image data is included in each printing information. The digital composite machine 1 performs image processing for the image data to decrease the toner quantity in the mode for the case where the image data is included, or the case where the image data is not included, and then executes printing. Therefore, the digital composite machine 1 can print to maintain the printing quality for each page while decreasing the quantity of toner used for printing.

Further, since the mode of the control program to perform image processing to decrease the toner quantity can be previously set for each printing information based on the kind of the page kind data, the digital composite machine 1 can reproduce data by printing as desired by the user.

Further, in the above-mentioned each embodiment, the digital composite machine 1 is to perform image processing in the mode to decrease the toner quantity to the extent to maintain the image printing quality when the image data is included in the page kind data, but when the high printing quality is demanded, it is also possible to set the mode not to decrease the quantity of toner used for printing when the image data is included in the page kind data.

Same image processing is to be performed for the text data and graphic data, but it is allowable to perform different image processing for these data.

Further, for example, when the image data printing area is narrow, it may occur to give priority to decrease of the quantity of toner used for printing, over the image printing quality. In this case, the digital composite machine 1 is permitted to perform image processing for the image data for each page or each printing information, according to the mode set for the processing for the case where the ratio of the text data, graphic data and image data included in the page kind data is high.

In short, the digital composite machine 1 can freely set the modes to perform the image processing by decreasing the quantity of toner used for printing, or the mode not to decrease the quantity of toner, for each page or each printing information, based on the page kind data included in the printing information.

Further, the page kind data created by the driver of the PC 2 is to indicate the ratio of text data, graphic data and image data for each page, but the data type is not limited to them, and changeable by setting the driver.

In each of the above-mentioned embodiment, the page kind data created by the driver of the PC 2 is included in the printing information as the information indicating the ratio of text data, graphic data and image data for each page. This structure of page kind data avoids a problem of increase in a hardware scale for image processing and a time delay in image processing, which occurs when the data indicating whether the data is text data, graphic data or image data, is added to the image data for every pixel, and the image processing to decrease the quantity of toner used for printing is performed for every pixel.

In the above-mentioned embodiments, the present invention is applied to the digital composite machine 1. The applicable apparatus is not limited to the digital composite machine. For example, the present invention is also applicable to an image forming apparatus such as a printer which adopts an ink jet system using ink as a printing material.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the invention as defined by the appended claims and equivalents thereof.

What is claimed is:

1. An image forming apparatus, comprising:
    a connection unit which is connected to a network to perform communication;
    a receiving unit which receives print data and printing information including at least page kind data indicating the kinds of data for each page and image data, through the connection unit, wherein said page kind data being information indicating a text, a graphic and an image;
    a determining unit which determines said page kind data information of the received print data;
    an image processing unit which performs image processing for the print data to properly decrease the quantity of printing material used for printing for each predetermined unit, based on the received page kind data, said image processing unit having a first mode for decreasing the quantity of the printing material and a second mode for decreasing the quantity of the printing material more than that of the first mode, and performing the image processing the second mode when the determined page kind data information indicates the text or graphic and performing the image processing in the first mode when the determined page kind data information indicates the image;
    wherein said first mode takes precedence over a recovery of the image rather than the decrease of the printing material, and the second mode takes precedence over the decrease of the printing material rather than the recovery of the image; and
    a printing unit which prints the processed print data on a printing medium.

2. The image forming apparatus according to claim 1, wherein the predetermined unit is a page.

3. The image forming apparatus according to claim 1, wherein the predetermined unit is a printing information.

4. A method of printing in an image forming apparatus, comprising:
    a connection step which connects the image forming apparatus to a network to perform communication;
    a receiving step which receives a print data and printing information including at least page kind data indicating the kinds of data for each page and image data, through the connection unit, wherein said page kind data being information indicating a text, a graphic and an image data;
    a determining step which determines said page kind data information of the received print data;

an image processing step which performs image processing for the print data to properly decrease the quantity of printing material used for printing for each predetermined unit, based on the received page kind data, said image processing unit having a first mode for decreasing the quantity of the printing material and a second mode for decreasing the quantity of the printing material more than that of the first mode, and performing the image processing in the second mode when the determined page kind data information indicates the text or graphic and performing the image processing in the first mode when the determined page kind data information indicates the image;

wherein said first mode takes precedence over a recovery of the image rather than the decrease of the printing material, and the second mode takes precedence over the decrease of the printing material rather than the recovery of the image; and a printing step which prints the processed print data on a printing medium.

5. The method according to claim 4, wherein the predetermined unit is a page.

6. The method according to claim 4, wherein the predetermined unit is a printing information.

7. An image forming apparatus, comprising:

a connection unit which is connected to a network to perform communication;

a receiving unit which receives a print data and printing information including at least page kind data indicating the kinds of data for each page and image data, through the connection unit, said wherein page kind data being information indicating a text, a graphic and an image and indicating each area ratio of the text, the graphic and the image on each page;

a determining unit which determines said page kind data information of the received print job;

an image processing unit which performs image processing for the print job to properly decrease the quantity of printing material used for printing for each predetermined unit, based on the received page kind data, said image processing unit having a first mode for decreasing the quantity of the printing material and a second mode for decreasing the quantity of the printing material more than that of the first mode, and performing the image processing in the second mode when the determined page kind data information indicates that the area ratio of the text or the graphic is greater than that of the image and performing the image processing in the first mode when the determined page kind data information indicates that the area ratio of the image is greater than that of the text and graphic;

wherein said first mode takes precedence over a recovery of the image rather than the decrease of the printing material, and the second mode takes precedence over the decrease of the printing material rather than the recovery of the image; and a printing unit which prints the processed print data on a printing medium.

8. The image forming apparatus according to claim 7, wherein the predetermined unit is a page.

9. The image forming apparatus according to claim 7, wherein the predetermined unit is a printing information.

10. A method of printing in an image forming apparatus, comprising:

a connection step which connects an image forming apparatus to a network to perform communication;

a receiving step which receives a print data and printing information including at least page kind data indicating the kinds of data for each page and image data, through the connection unit, said wherein page kind data being information indicating a text, a graphic and an image and indicating each area ratio of the text, the graphic and the image on each page;

a determining step which determines said page kind data information of the received print data;

an image processing step which performs image processing for the print job to properly decrease the quantity of printing material used for printing for each predetermined unit, based on the received page kind data, said image processing unit having a first mode for decreasing the quantity of the printing material and a second mode for decreasing the quantity of the printing material more than that of the first mode, and performing the image processing in the second mode when the determined page kind data information indicates that the area ratio of the text or the graphic is greater than that of the image and performing the image processing in the first mode when the determined page kind data information indicates that the area ratio of the image is greater than that of the text and graphic;

wherein said first mode takes precedence over a recovery of the image rather than the decrease of the printing material, and the second mode takes precedence over the decrease of the printing material rather than the recovery of the image; and a printing step which prints the processed print data on a printing medium.

11. The method according to claim 10, wherein the predetermined unit is a page.

12. The method according to claim 10, wherein the predetermined unit is a printing information.

* * * * *